(12) United States Patent
Bushman et al.

(10) Patent No.: US 9,154,899 B1
(45) Date of Patent: Oct. 6, 2015

(54) COMMUNICATION TRANSCEIVER CONFIGURATION IN RESPONSE TO OPTICALLY RECEIVING AN IMAGE IN A WIRELESS COMMUNICATION DEVICE

(75) Inventors: Serge J. L. Bushman, Overland Park, KS (US); M. Jeffrey Stone, Overland Park, KS (US); Sharon T. Haubrich, Kansas City, MO (US); Ashwin Shashindranath, Overland Park, KS (US); Jeffrey Scott Barrington, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2294 days.

(21) Appl. No.: 12/043,199

(22) Filed: Mar. 6, 2008

(51) Int. Cl.
*H04W 4/00* (2009.01)

(52) U.S. Cl.
CPC ........................................ *H04W 4/00* (2013.01)

(58) Field of Classification Search
USPC ............................ 455/450; 709/203, 206, 218
See application file for complete search history.

(56) References Cited

U.S. PATENT DOCUMENTS

| | | |
|---|---|---|
| 6,203,069 B1 | 3/2001 | Outwater et al. |
| 6,264,106 B1 | 7/2001 | Bridgelall |
| 6,513,017 B1 | 1/2003 | Howard et al. |
| 6,816,075 B2 | 11/2004 | Grunes et al. |
| 6,947,571 B1 | 9/2005 | Rhoads et al. |
| 6,961,555 B1 | 11/2005 | Philyaw |
| 6,993,573 B2 * | 1/2006 | Hunter .......................... 709/218 |
| 7,068,170 B2 | 6/2006 | Green |
| 7,121,469 B2 | 10/2006 | Dorai et al. |
| 7,181,066 B1 | 2/2007 | Wagman et al. |
| 7,190,835 B2 | 3/2007 | Durbin et al. |
| 7,222,791 B2 | 5/2007 | Heilper et al. |
| 7,274,931 B2 | 9/2007 | Harris |

(Continued)

FOREIGN PATENT DOCUMENTS

| | | |
|---|---|---|
| EP | 0645728 | 3/1995 |
| JP | 2008090512 | 4/2008 |
| WO | WO-2006107610 | 10/2006 |

OTHER PUBLICATIONS

Jan Harris, "Accelerometers Could Enhance Camera Phone Pictures," Camera Core, Mar. 23, 2007, 3 pages, camera-core.co.uk, http://www.camera-core.co.uk/23-03-2007-accelerometers-could-enhance-camera-phonespictures.html.

(Continued)

*Primary Examiner* — Michael Faragalla

(57) ABSTRACT

A wireless communication device optically receives an image that is associated with a user device and processes the received image to generate image data. The wireless communication device transfers user information and the image data to a communication network. The communication network processes the user information and the image data to generate configuration data to allow the user device to access the communication network. The communication network transfers the configuration data to a communication transceiver. The communication transceiver receives a communication from the user device, and in response to the configuration data, the communication transceiver transfers the communication to the communication network.

25 Claims, 6 Drawing Sheets

(56) References Cited

U.S. PATENT DOCUMENTS

| | | | |
|---|---|---|---|
| 7,523,866 | B2 | 4/2009 | Longacre, Jr. et al. |
| 7,634,065 | B2 | 12/2009 | Fukunaga et al. |
| 2001/0056359 | A1 | 12/2001 | Abreu |
| 2002/0052211 | A1 | 5/2002 | Kim et al. |
| 2002/0078363 | A1 | 6/2002 | Hill et al. |
| 2003/0156032 | A1 | 8/2003 | Adams et al. |
| 2003/0188017 | A1* | 10/2003 | Nomura ................... 709/241 |
| 2003/0229678 | A1 | 12/2003 | Wen et al. |
| 2003/0233432 | A1 | 12/2003 | Davis et al. |
| 2004/0145613 | A1 | 7/2004 | Stavely et al. |
| 2004/0153553 | A1 | 8/2004 | Chotkowski et al. |
| 2005/0011957 | A1 | 1/2005 | Attia et al. |
| 2005/0029354 | A1 | 2/2005 | Frantz et al. |
| 2005/0044179 | A1 | 2/2005 | Hunter |
| 2005/0080681 | A1 | 4/2005 | Ohnishi |
| 2005/0173524 | A1 | 8/2005 | Schrader |
| 2006/0002591 | A1 | 1/2006 | Hombo |
| 2006/0020614 | A1 | 1/2006 | Kolawa et al. |
| 2006/0026048 | A1 | 2/2006 | Kolawa et al. |
| 2006/0042139 | A1 | 3/2006 | Mendes |
| 2006/0100925 | A1 | 5/2006 | Finaly |
| 2006/0212938 | A1 | 9/2006 | Suzuki |
| 2007/0061242 | A1 | 3/2007 | Ramer et al. |
| 2007/0061243 | A1 | 3/2007 | Ramer et al. |
| 2007/0061303 | A1 | 3/2007 | Ramer et al. |
| 2007/0083381 | A1 | 4/2007 | Farrell et al. |
| 2007/0133567 | A1 | 6/2007 | West et al. |
| 2007/0150588 | A1 | 6/2007 | Ghadialy et al. |
| 2007/0290045 | A1 | 12/2007 | Cisar |
| 2007/0290499 | A1 | 12/2007 | Tame |
| 2009/0086045 | A1 | 4/2009 | Giebel et al. |
| 2010/0041968 | A1 | 2/2010 | Meschisen et al. |

OTHER PUBLICATIONS

Jewels et Jim, "Fashionable Medical I.D. Jewelry," May 8, 2008, 1 page, http://www.jewelsetjim.com/.

Livecycle, "Using Barcode Data in Processes," LiveCycle Workbench ES Help, Nov. 20, 2008, 3 pages, LiveCycle, ttp://livedocs.adobe.com/livecycle/es/wb_help/wwhelp/wwhimpl/common/html/wwhelp.htm?context=Workbench_ES&file=00001152.html.

Projectresponder.com, "Medical Alert Bracelet," May 8, 2008, 3 pages, http://www.projectrespondercom/medical-alert-bracele18 139.htm.

Pegasus Imaging Corporation, "Using Barcodes in Documents-Best Practices," Barcode Basics, 2007, pp. 1-9, Pegasus Imaging Corporation, http://www.pegasusimaging.com/BarcodesinDocuments-BestPractices.pdf.

Popular Electronics, "Apple Unlocked GSM Cell Phone," Nov. 21, 2008, 3 pages, Popular Electronics, http://www.popularelect.com/index.php?cPath=21_62.

Popular Electronics, "Nokia N82 Unlocked Quad Band GSM 5+ Megapixel Camera Cell Phone," Nov. 21, 2008, 3 pages, Popular Electronics, http://www.popularelect.com/product_info.php-?products_id=875&osCsid=d9b4eb6c7150c354f9fc573c748b2c06.

Xiaoming Zhao, et al., "Integration of Information Technology, Wireless Networks, and Personal Digital Assistants for Triage and Casualty," Telemedicine and e-Health, Aug. 1, 2006, 2 pages, vol. 12, No. 4, Mary Ann Liebert, Inc., New Rochelle, New York, http://www.liebertonline.com/doi/abs/10.1089/tmj.2006.12.466?cookieSet=1&journalCode=tmj.

USPTO Office Action Summary dated Nov. 23, 2010 from U.S. Appl. No. 12/043,239.

* cited by examiner

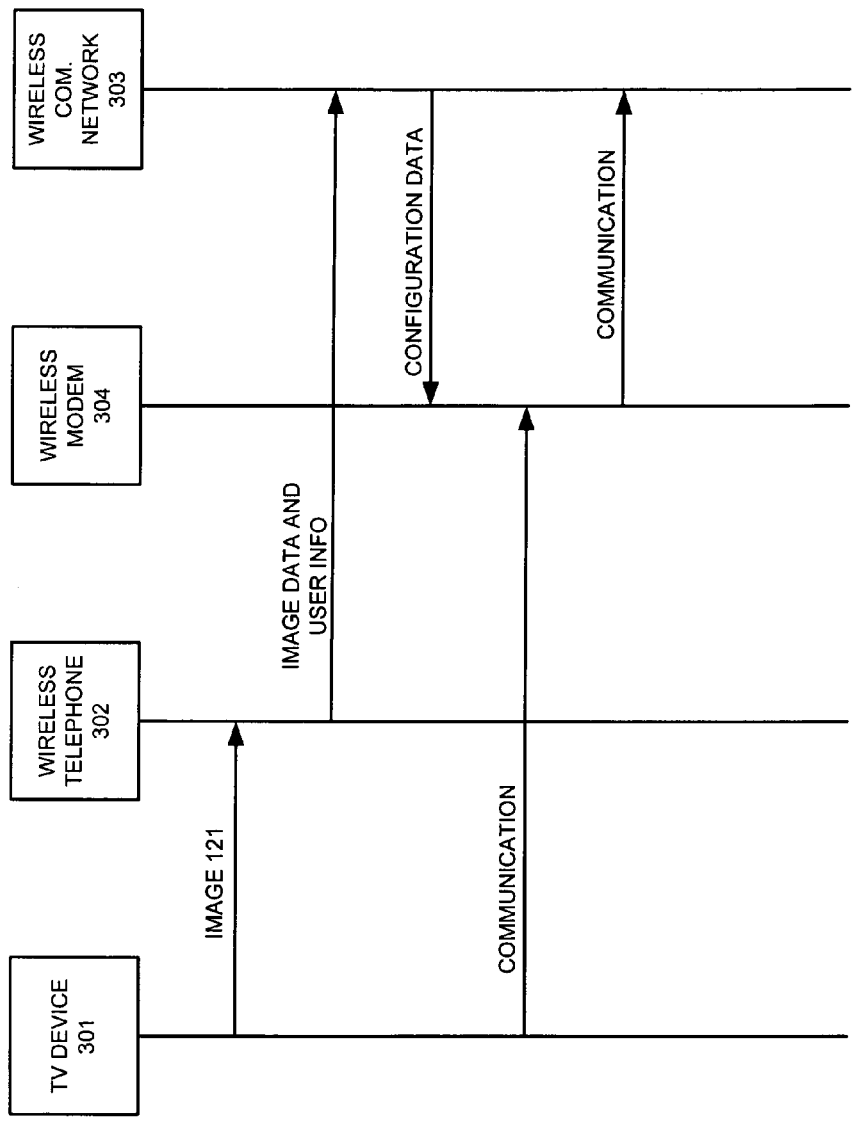

COMMUNICATION TRANSCEIVER CONFIGURATION IN RESPONSE TO OPTICALLY RECEIVING AN IMAGE IN A WIRELESS COMMUNICATION DEVICE

TECHNICAL BACKGROUND

A two-dimensional bar-code may include data that directs a wireless telephone to download media content. In this scenario, the wireless telephone takes a picture of the two-dimensional bar-code. The wireless telephone then de-codes the picture of the bar-code into corresponding data. This de-coded data directs the wireless telephone to retrieve the media content from a content host.

A wireless modem exchanges communications over the air with various devices that are located near the modem. The wireless modem then exchanges these communications with a communication network. To prevent unwanted devices from accessing the communication network through the wireless modem, the wireless modem typically requires a specific user name and access code from a device before network access is provided.

OVERVIEW

In some examples, a wireless communication device optically receives an image that is associated with a user device and processes the received image to generate image data. The wireless communication device transfers user information and the image data to a communication network. The communication network processes the user information and the image data to generate configuration data to allow the user device to access the communication network. The communication network transfers the configuration data to a communication transceiver. The communication transceiver receives a communication from the user device, and in response to the configuration data, the communication transceiver transfers the communication to the communication network.

In some examples, a wireless telephone optically receives a bar-code that is associated with a user device and processes the received image to generate bar-code data. The wireless telephone wirelessly transfers a number for the wireless telephone and the bar-code data to a wireless communication network. The wireless communication network processes the number to identify a wireless modem. The wireless communication network processes the identity of the wireless modem and the bar-code data to generate configuration data. The configuration data directs the wireless modem to allow the user device to access the wireless communication network. The wireless communication network wirelessly transfers the configuration data to the wireless modem. The wireless modem receives a wireless communication from the user device, and in response to the configuration data, wirelessly transfers the wireless communication to the wireless communication network.

BRIEF DESCRIPTION OF THE DRAWINGS

FIG. 6 is a sequence diagram that illustrates the operation of the wireless communication system.

DETAILED DESCRIPTION

Figure 1:
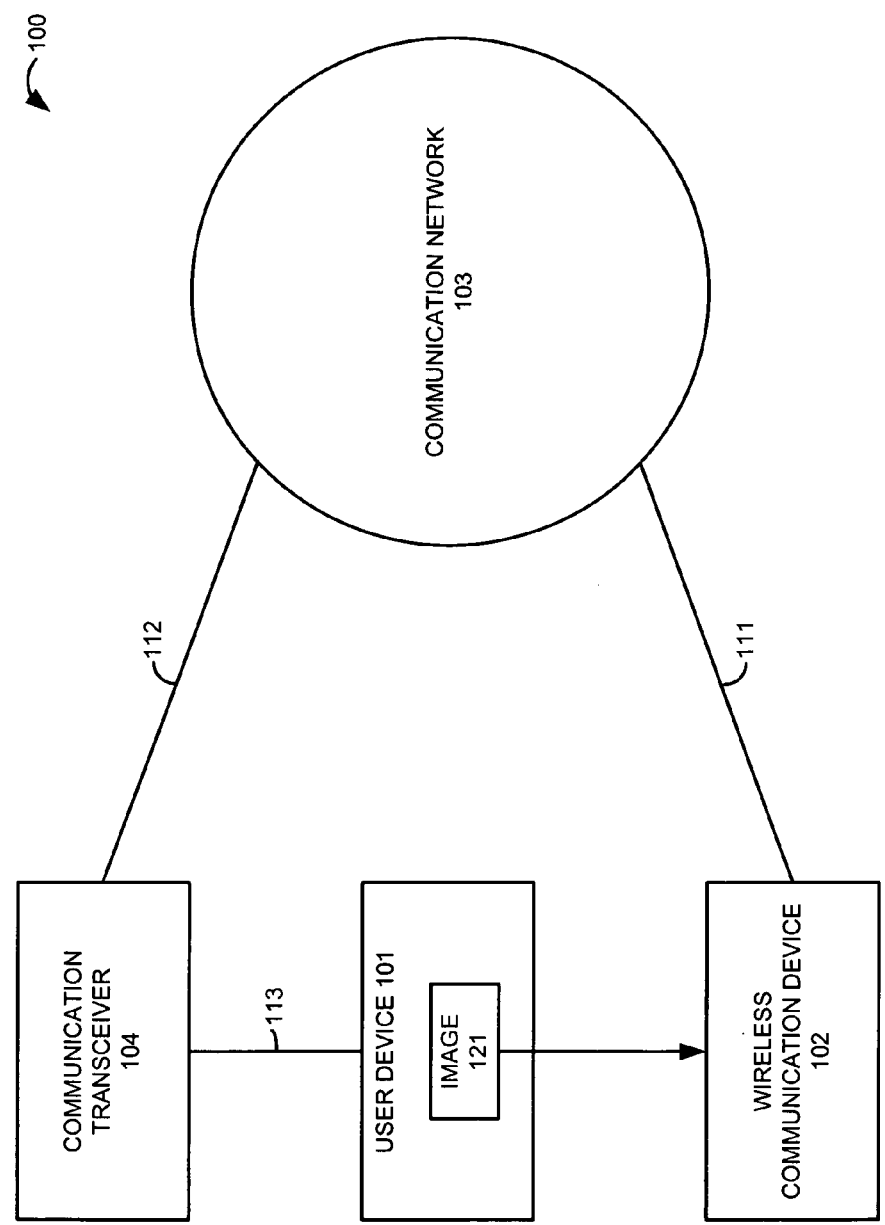
FIG. 1 is a block diagram that illustrates a communication system.

FIG. 1 is a block diagram that illustrates communication system 100. Communication system 100 comprises user device 101, wireless communication device 102, communication network 103, and communication transceiver 104. Wireless communication device 102 and communication network 103 exchange communications over wireless link 111. Communication network 103 and communication transceiver 104 exchange communications over communication link 112. User device 101 and communication transceiver 104 exchange communications over communication link 113.

Link 111 uses the air (or space) as the transport media. Link 111 could use various protocols, such as wireless fidelity, code division multiple access, worldwide interoperability for microwave access, internet, telephony, or some other communication format—including combinations thereof. Links 112-113 use various communication media, such as air, metal, optical fiber, or some other signal propagation path—including combinations thereof. Links 112-115 use various protocols, such as internet, telephony, optical networking, wireless communication, wireless fidelity, code division multiple access, worldwide interoperability for microwave access, or some other communication format—including combinations thereof. Links 111-113 could be direct links or they might include various intermediate components, systems, and networks.

User device 101 is an apparatus that presents image 121 and transfers communications over communication link 113. Examples of user device 104 include televisions, computers, automobiles, business machines, appliances, and video game consoles, although there are many other examples. Image 121 is associated with user device 101. Image 121 could be a bar code, product identification number, user account code, product name, or some other designation for user device 101—including the actual image of user device 101.

Wireless communication device 102 comprises a telephone, transceiver, computer, digital assistant, Internet appliance, or some other wireless communication apparatus—including combinations thereof. As indicated by the arrow, wireless communication device 102 optically receives image 121 and processes the received image to generate image data. For example, communication device 102 may take a picture of image 121, collect video of image 121, or perform some other form of optical reception.

The image data comprises an electrical representation of image 121 or comprises decoded data that is associated with user device 101. For example, the image data could be a picture of user device 101, a picture of an image or code on user device 101, or some other data, such as decoded bar code data, that indicates the identity of user device 101. Wireless communication device 102 generates user information, such as a telephone number, user account number, user name, or some other designation for the user. Wireless communication device 102 transfers the image data and the user information over wireless link 111 in response to the optical reception and processing of image 121.

Communication network 103 comprises wireless access points, telephony switches, internet routers, network gateways, computer systems, communication links, or some other type of communication equipment—including combinations thereof. Communication network 103 receives the user information and the image data over wireless link 111. Communication network 103 processes the user information and the image data to generate configuration data. The configuration data allows user device 101 to access communication network 103 through communication transceiver 104. The configuration data may include a user name, access code, device driver, software application, or some other information. Communication network 103 transfers the configuration data to communication transceiver 104 over communication link 112.

For example, communication network 103 may process a picture of a code on user device 101 to identify device 101, and then process the identity of device 101 to obtain configuration data to provide network access to device 101. In another example, communication network 103 may process a picture of user device 101 itself to identify device 101, and then process the identity of device 101 to obtain the configuration data. In another example, wireless communication device 102 may decode the received image into a product identification code, and communication network 103 may process the product identification code to identify device 101 and obtain the configuration data.

Communication transceiver 104 comprises a telephone, modem, computer, digital assistant, Internet appliance, or some other communication apparatus—including combinations thereof. Communication transceiver 104 receives the configuration data from communication network 103 over communication link 112. Communication transceiver 104 receives a communication from user device 101 over communication link 113. In response to the configuration data, communication transceiver 104 transfers the communication to communication network 103 over communication link 112.

For security reasons, user device 101 cannot effectively communicate over communication network 103 through communication transceiver 104 until communication transceiver 104 is properly configured. Advantageously, the simple optical reception of image 121 by wireless communication device 102 causes the automatic configuration of communication transceiver 104 to enable such communications. Thus, the user may conveniently operate their wireless communication device 102 to enable multiple devices, such as computers, game consoles, and appliances, to securely communicate through their communication transceiver 104.

Figure 2:
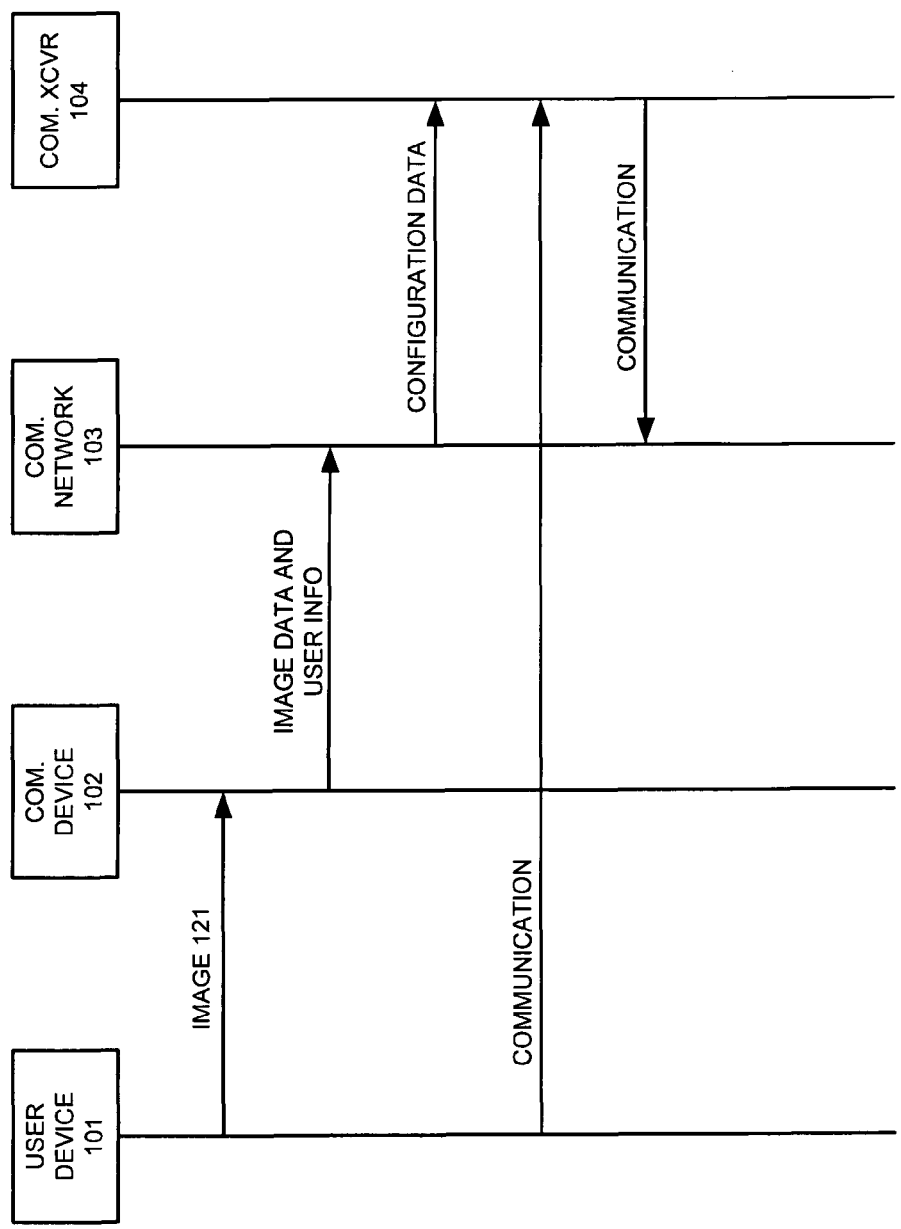
FIG. 2 is a sequence diagram that illustrates the operation of the communication system.

FIG. 2 is a sequence diagram that illustrates the operation of communication system 100. Prior to the operational sequence, communication transceiver 104 would not transfer communications from user device 101 to communication network 103. The operational sequence begins when wireless communication device 102 optically receives image 121 from user device 101 and processes the received image to generate image data. Wireless communication device 102 also generates user information. Wireless communication device 102 transfers the image data and the user information to communication network 103. Communication network 103 processes the user information and the image data to generate configuration data. Communication network 103 transfers the configuration data to communication transceiver 104. Communication transceiver 104 receives a communication from user device 101, and in response to the configuration data, transfers the communication to communication network 103.

Communication network 103 typically transfers the communication to another network or user. For example, communication network 103 may transfer the communication to the Internet. In a reciprocal fashion, communication network 103 may receive a communication from another network or user and transfer this communication to user device 101 over communication transceiver 104 and communication links 112-113.

Although user device 101 and communication transceiver 104 are shown separately, they could be integrated within the same device. Link 113 would then represent the electronic connections between the integrated components. For example, user device 101 could be a television, and communication transceiver 104 could be wireless communication circuitry in the television.

Figure 3:
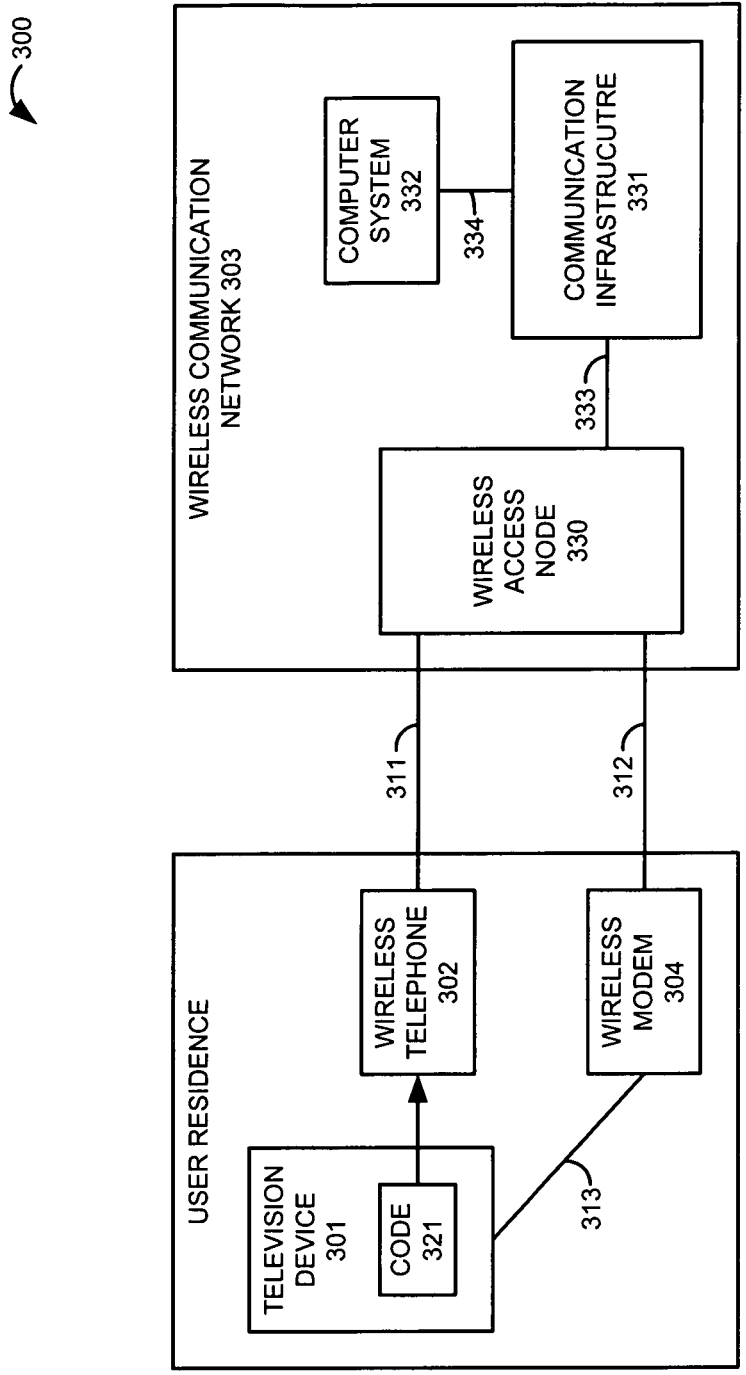
FIG. 3 is a block diagram that illustrates a wireless communication system.

FIG. 3 is a block diagram that illustrates wireless communication system 300. Wireless communication system 300 comprises television device 301, wireless telephone 302, wireless communication network 303, and wireless modem 304. Television device 301, wireless telephone 302, and wireless modem 304 are located at a user residence. Wireless communication network 303 comprises wireless access node 330, communication infrastructure 331, and computer system 332. Wireless telephone 302 and wireless access node 330 communicate over wireless link 311. Wireless modem 304 and wireless access node 330 communicate over wireless link 312.

Television device 301 and wireless modem 304 communicate over wireless link 313. Television device 301 is configured to use a specific user name and access code for wireless communications. Television device 301 optically presents code 321 that indicates this user name and access code. Code 321 could be a two-dimensional bar code. Although television device 301 and wireless modem 304 are shown separately, wireless modem 304 could be integrated within television device 301. Link 313 would then represent the electronic connections between the integrated components.

Communication infrastructure 331 comprises telephony switches, internet routers, network gateways, communication links, or some other type of communication equipment—including combinations thereof. Communication infrastructure 331 and wireless access node 330 communicate over communication link 333. Communication infrastructure 331 and computer system 332 communicate over communication link 334. Thus, computer system 332 may communicate with wireless telephone 302 and wireless modem 304 over wireless access node 330, communication infrastructure 331, and links 311-312 and 333-334.

Figure 4:
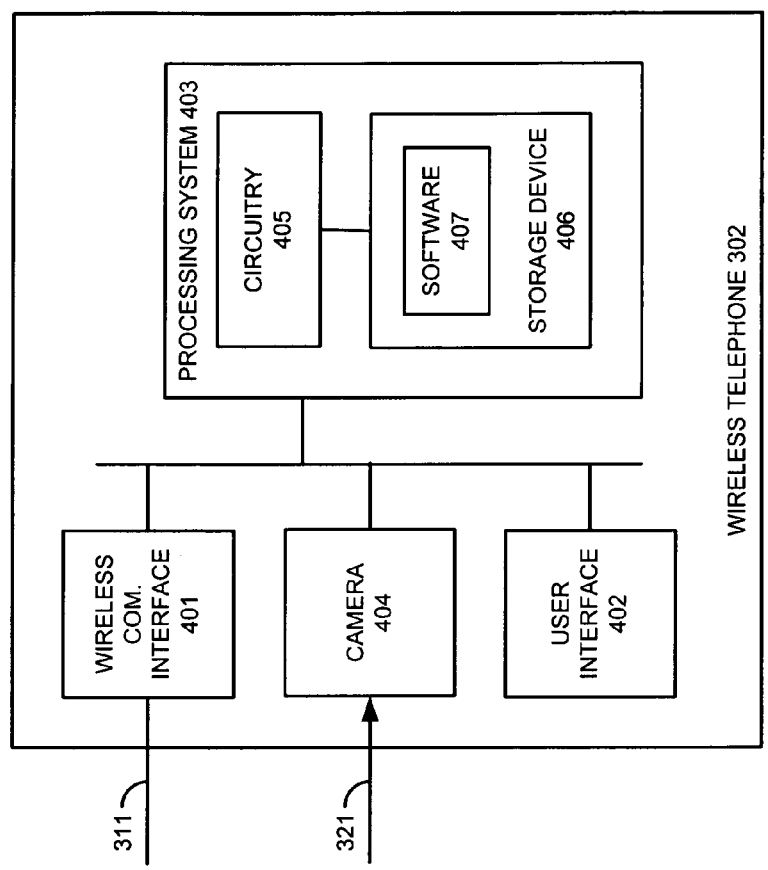
FIG. 4 is a block diagram that illustrates a wireless telephone in the wireless communication system.

FIG. 4 is a block diagram that illustrates wireless telephone 302. Wireless telephone 302 comprises wireless communication interface 401, user interface 402, processing system 403, and camera 404. Processing system 403 is linked to wireless communication interface 401, user interface 402, and camera 404. Processing system 403 includes circuitry 405 and storage device 406 that stores operating software 407.

Wireless communication interface 401 comprises components that communicate over wireless link 311 under the control of processing system 403. Wireless communication interface 401 comprises a wireless transceiver including an antenna or some other wireless communication device. User interface 402 comprises components that interact with the user under the control of processing system 403. User interface 402 may include a speaker, microphone, buttons, lights, display screen, touch screen, touch pad, scroll wheel, or some other user input/output apparatus. Circuitry 405 comprises microprocessor and other circuitry that retrieves and executes operating software 407 from storage device 406 to control wireless communication interface 401, user interface 402, and camera 404. Storage device 406 comprises a disk drive, flash drive, memory circuitry, or some other memory device. Operating software 407 comprises computer programs, firmware, or some other form of machine-readable processing instructions. Operating software 407 may include an operating system, utilities, drivers, network interfaces, applications, or some other type of software. When executed by circuitry 405, operating software 407 directs processing system 403 to operate wireless telephone 302 as described herein.

Camera 404 is configured to optically receive images and transfer the received images to processing system 403. Camera 404 operates in response to instructions from processing system 403. Camera 404 could be a conventional wireless telephone camera or some other optical capture device.

Figure 5:
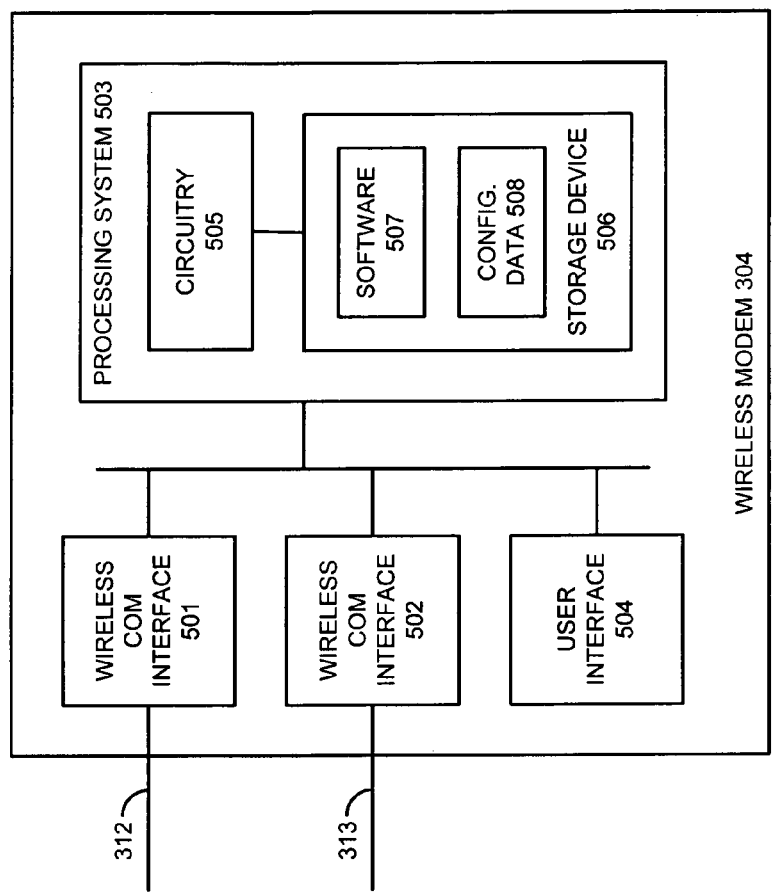
FIG. 5 is a block diagram that illustrates a wireless modem in the wireless communication system.

FIG. 5 is a block diagram that illustrates wireless modem 304. Wireless modem 304 comprises wireless communication interfaces 501-502, processing system 503, and user interface 504. Processing system 503 is linked to wireless communication interfaces 501-502 and user interface 504. Processing system 503 includes circuitry 505 and storage device 506 that stores operating software 507 and configuration data 508.

Wireless communication interface 501 comprises components that communicate over wireless link 312 under the control of processing system 503. Wireless communication interface 501 comprises a wireless transceiver including an antenna or some other wireless communication device. Wireless communication interface 502 comprises components that communicate over wireless link 313 under the control of processing system 503. Wireless communication interface 502 comprises a wireless transceiver including an antenna or some other wireless communication device. User interface 504 comprises components that interact with the user under the control of processing system 503. User interface 504 may include buttons, lights, display screen, touch screen, touch pad or some other user input/output apparatus. Circuitry 505 comprises microprocessor and other circuitry that retrieves and executes operating software 507 and configuration data 508 from storage device 506 to control wireless communication interfaces 501-502 and user interface 504. Storage device 506 comprises a disk drive, flash drive, memory circuitry, or some other memory device. Operating software 507 and configuration data 508 comprise computer programs, firmware, or some other form of machine-readable processing instructions. Operating software 507 and configuration data 508 may include an operating system, utilities, drivers, network interfaces, applications, or some other type of software. Configuration data 508 includes the user name and access code for television device 301. Configuration data 508 may be embedded within software 507. When retrieved and executed by circuitry 505, operating software 507 and configuration data 508 direct processing system 503 to operate wireless modem 304 as described herein.

FIG. 6 is a sequence diagram that illustrates the operation of wireless communication system 300. Prior to the operational sequence, wireless modem 304 would not transfer communications between television device 301 and communication network 303. The operational sequence begins when wireless telephone 302 optically receives and processes code 321 from television device 301 to generate image data indicating the user name and access code for television device 301. Wireless telephone 302 transfers the image data (user name and access code) and user information (telephone 302 number) to computer system 332 of communication network 303.

Computer system 332 processes the telephone number of wireless telephone 302 to identify wireless modem 304. Thus, computer system 332 stores or has access to data that associates user telephone numbers with user wireless modems. Computer system 332 processes the user name and access code for television device 301 to generate configuration data 508. Configuration data 508 includes the user name and access code for television device 301. Computer system 332 transfers configuration data 508 to wireless modem 304. Wireless modem 304 receives and stores configuration data 508. Wireless modem 304 then receives a communication including the user name and access code from television device 301. Wireless modem 304 compares the user name and access code in the communication to the user name and access code in configuration data 508, and since there is a match, wireless modem 304 transfers the communication to wireless access node 330 of communication network 303.

In an alternative to the above sequence, code 321 may only indicate a product identification code, and computer system 332 may store or have access to data that associates product identification codes with the user names and access codes used by the products. Computer system 332 would then process the product identification code from the image data to obtain the user name and access code for the product.

In an addition to the above sequence, wireless modem 304 may communicate with the television device 301 in response to configuration data 508 to invite television device 301 to communicate through wireless modem 304 using the user name and access code.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of configuring a communication transceiver to allow a user device to access a communication network, the method comprising:
   in a wireless communication device, optically receiving an image that is associated with the user device and processing the received image to generate image data and transferring user information and the image data;
   in the communication network, receiving and processing the user information and the image data to generate configuration data that directs the communication transceiver to allow the user device to access the communication network and transferring the configuration data;
   in the communication transceiver, receiving a communication from the user device and the configuration data, and in response, transferring the communication to the communication network.

2. The method of claim 1 wherein the image comprises a bar-code associated with the user device.

3. The method of claim 1 wherein the image data comprises a picture of the user device.

4. The method of claim 1 wherein the image data comprises a picture of a code on the user device.

5. The method of claim 1 wherein the user information comprises a telephone number for the wireless communication device.

6. The method of claim 1 wherein the user information comprises an identification number for the wireless communication device.

7. The method of claim 1 wherein the user information comprises a user account code.

8. The method of claim 1 wherein processing the user information and the image data to generate the configuration data comprises processing the user information to identify the communication transceiver, processing the image data to identify the user device, and processing the identities of the communication transceiver and the user device to generate the configuration data.

9. The method of claim 1 wherein transferring the user information and the image data from the wireless communication device and receiving the user information and the image data in the communication network comprises wirelessly transferring the user information and the image data between the wireless communication device and the communication network over an air interface.

10. The method of claim 1 wherein transferring the configuration data from the communication network and receiving the configuration data in the communication transceiver comprises wirelessly transferring the configuration data between the communication network and the communication transceiver and over an air interface.

11. The method of claim 1 wherein receiving the communication from the user device in the communication transceiver comprises wirelessly receiving the communication from the user device over an air interface.

12. The method of claim 1 wherein the communication transceiver comprises a wireless modem.

13. A method of configuring a wireless modem to allow a user device to access a wireless communication network, the method comprising:
   in a wireless telephone, optically receiving and processing a bar-code that is associated with the user device to generate bar-code data and wirelessly transferring a number for the wireless telephone and the bar-code data to the wireless communication network;
   in the wireless communication network, processing the number to identify the wireless modem, processing the identity of the wireless modem and the bar-code data to generate configuration data that directs the wireless modem to allow the user device to access the wireless communication network, and wirelessly transferring the configuration data to the wireless modem; and
   in the wireless modem, receiving a wireless communication from the user device, and in response to the configuration data, wirelessly transferring the wireless communication from the wireless modem to the wireless communication network.

14. A communication system comprising:
   a wireless communication device configured to optically receive an image that is associated with a user device and process the received image to generate image data and transfer user information and the image data;
   a communication network configured to receive and process the user information and the image data to generate configuration data to allow the user device to access the communication network and transfer the configuration data; and
   a communication transceiver configured to receive a communication from the user device and the configuration data, and in response, transfer the communication to the communication network.

15. The communication system of claim 14 wherein the image comprises a bar-code associated with the user device.

16. The communication system of claim 14 wherein the image data comprises a picture of the user device.

17. The communication system of claim 14 wherein the image data comprises a picture of a code on the user device.

18. The communication system of claim 14 wherein the user information comprises a telephone number for the wireless communication device.

19. The communication system of claim 14 wherein the user information comprises an identification number for the wireless communication device.

20. The communication system of claim 14 wherein the user information comprises a user account code.

21. The communication system of claim 14 wherein the communication network is configured to process the user information to identify the communication transceiver, process the image data to identify the user device, and process the identities of the communication transceiver and the user device to generate the configuration data.

22. The communication system of claim 14 wherein the wireless communication device and the communication network are configured to wirelessly transfer the user information and the image data over an air interface.

23. The communication system of claim 14 wherein the communication network and the communication transceiver are configured to wirelessly transfer the configuration data over an air interface.

24. The communication system of claim 14 wherein the communication transceiver is configured to wirelessly receive the communication from the user device over an air interface.

25. The communication system of claim 14 wherein the communication transceiver comprises a wireless modem.

* * * * *